R. G. BROOKE.
STEAM INJECTOR.
APPLICATION FILED NOV. 5, 1910.

991,268.

Patented May 2, 1911.
7 SHEETS—SHEET 1.

Witnesses:
E. R. Peck
S. L. Burket

Inventor:
Robert G. Brooke
by Herbert E. Dake
atty

R. G. BROOKE.
STEAM INJECTOR.
APPLICATION FILED NOV. 5, 1910.

991,268.

Patented May 2, 1911.
7 SHEETS—SHEET 2.

Witnesses:
E. R. Peck
S. S. Barker

Inventor:
Robert G. Brooke
by Herbert Peck
atty.

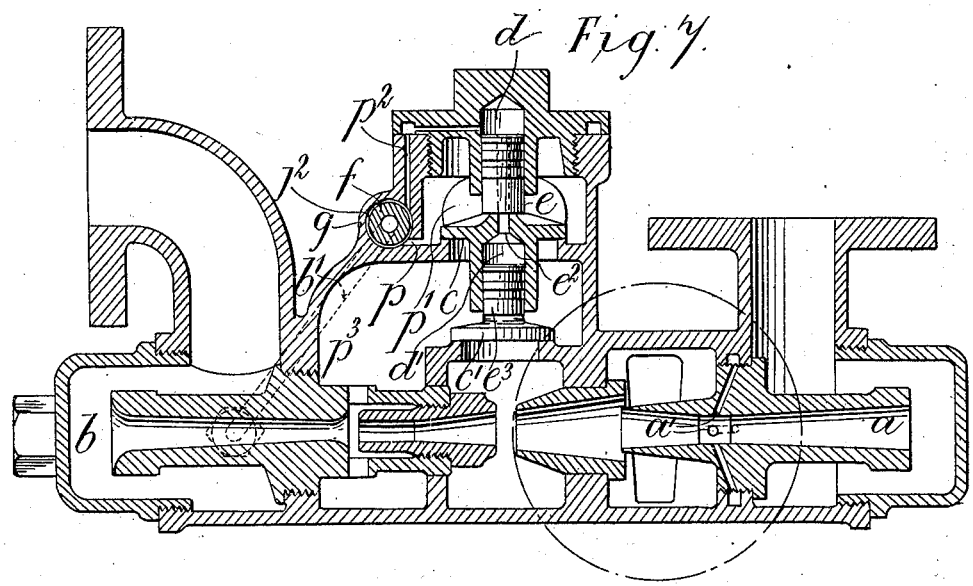
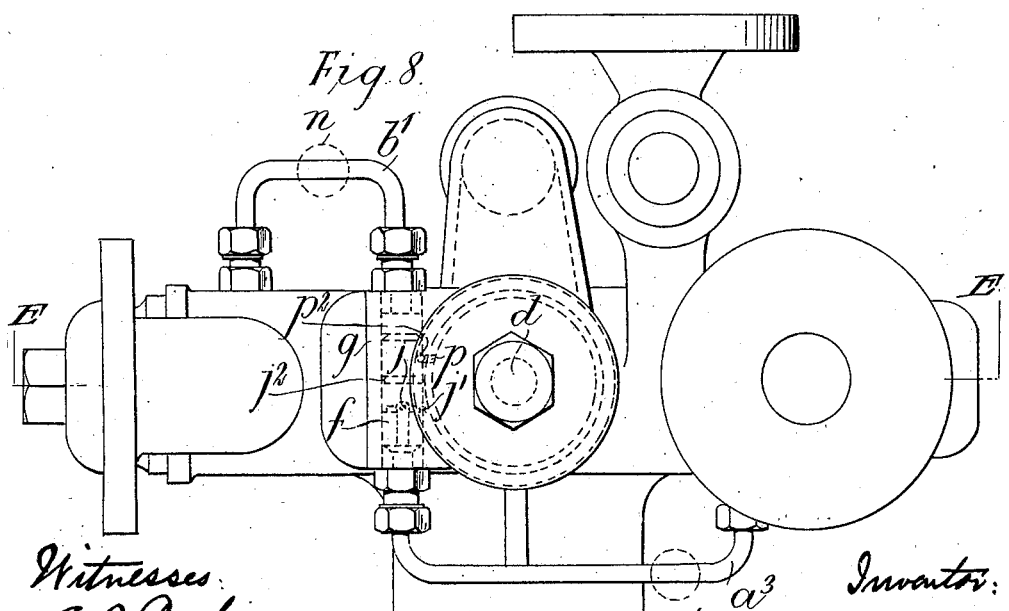

R. G. BROOKE.
STEAM INJECTOR.
APPLICATION FILED NOV. 5, 1910.

991,268.

Patented May 2, 1911.

7 SHEETS—SHEET 4.

R. G. BROOKE.
STEAM INJECTOR.
APPLICATION FILED NOV. 5, 1910.

991,268.

Patented May 2, 1911.
7 SHEETS—SHEET 5.

R. G. BROOKE.
STEAM INJECTOR.
APPLICATION FILED NOV. 5, 1910.

991,268.

Patented May 2, 1911.
7 SHEETS—SHEET 7.

Witnesses:
E. R. Peck
L. S. Burket

Inventor:
Robert G. Brooke
by Hubert E. Peck
Atty

UNITED STATES PATENT OFFICE.

ROBERT GRUNDY BROOKE, OF MACCLESFIELD, ENGLAND.

STEAM-INJECTOR.

991,268.        Specification of Letters Patent.        Patented May 2, 1911.

Application filed November 5, 1910. Serial No. 590,891.

*To all whom it may concern:*

Be it known that I, ROBERT GRUNDY BROOKE, a subject of the King of Great Britain and Ireland, residing at Macclesfield, in the county of Chester, England, have invented Improvements Relating to Steam-Injectors, of which the following is a specification.

This invention relates to injectors having an overflow valve adapted to be closed, or, after having been closed, to be maintained closed while the injector is at work by the pressure of a fluid acting thereon, and it has for its object to utilize the pressure of steam that is reduced in value compared with that entering the steam nozzle, for controlling the operation of the overflow valve.

The steam of reduced pressure referred to is derived from the region of a passage, preferably a Venturi-like tube, through which steam is passing at high velocity and under pressure, the usual steam nozzle being a specific example where such conditions are to be found and from the constriction in which the steam may be taken. The pressure of steam derived in this way is found to bear a practically constant ratio to the pressure of the fluid in the delivery chamber throughout the working range in which a closed overflow is required.

The invention can be carried into effect in many different ways and applied with but slight constructional alterations to various existing types of injectors, as well as to specially constructed injectors.

Figure 1:
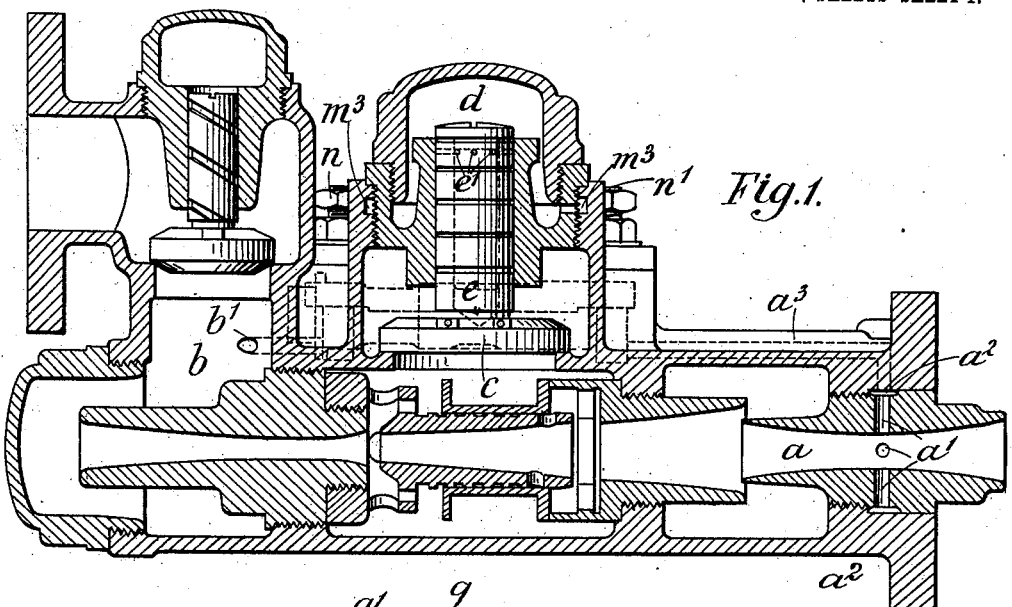
Figure 2:
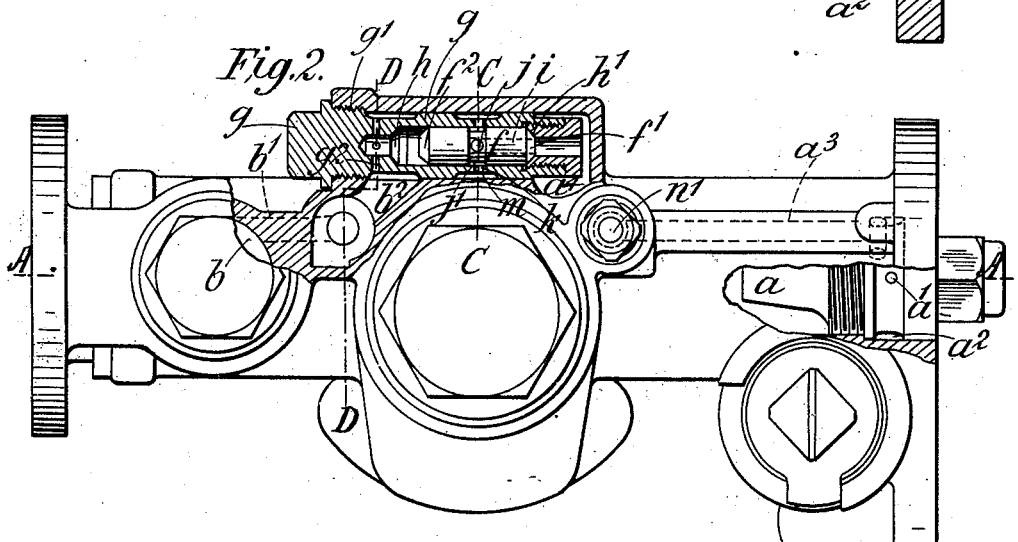
Figure 5:
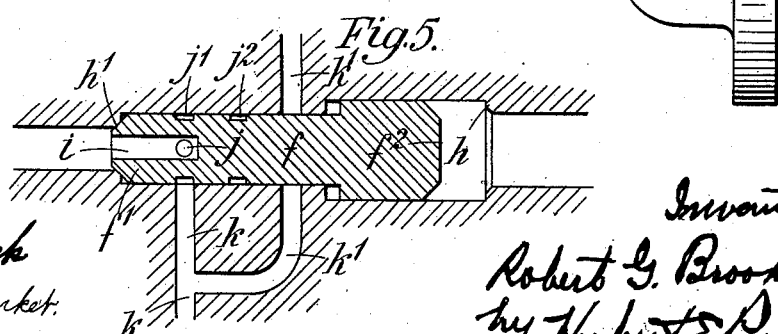
Figure 3:
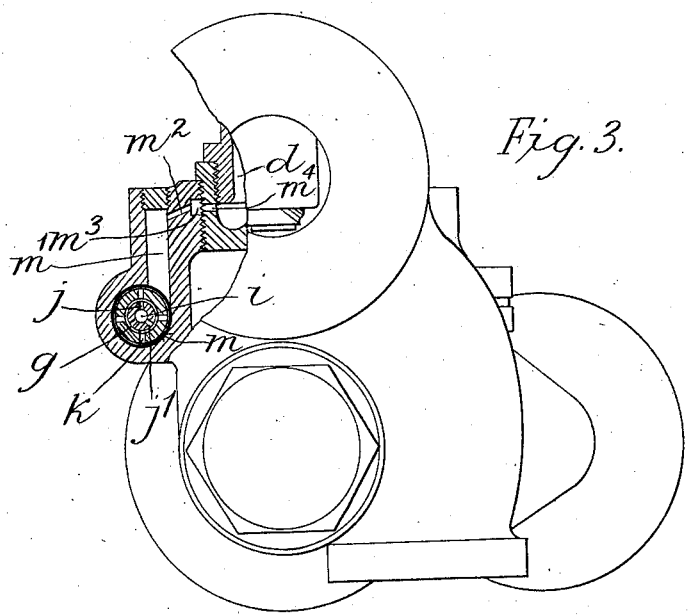
Figure 4:
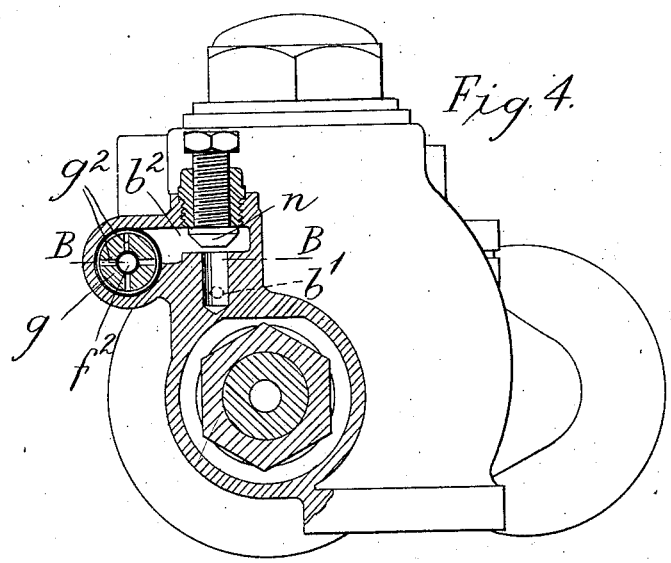
Figure 6:
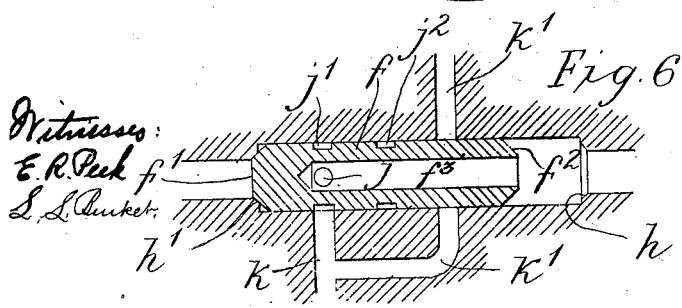
Figure 9:
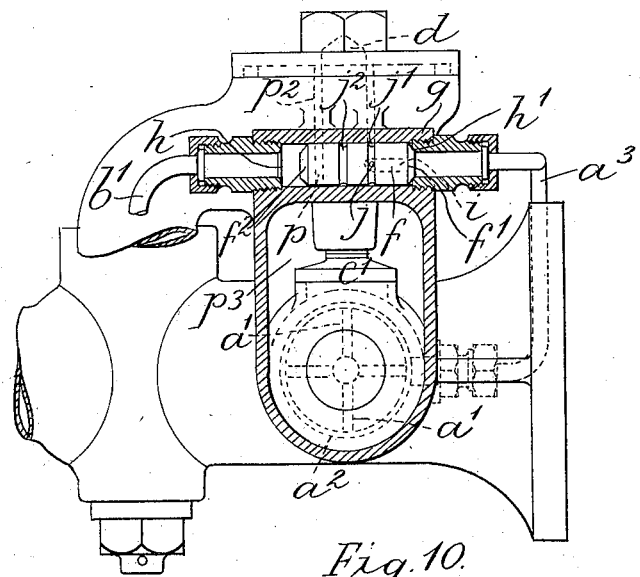
Figure 10:
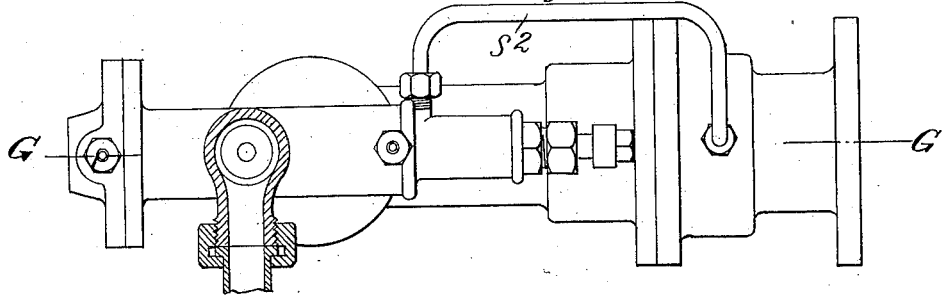
Figure 11:
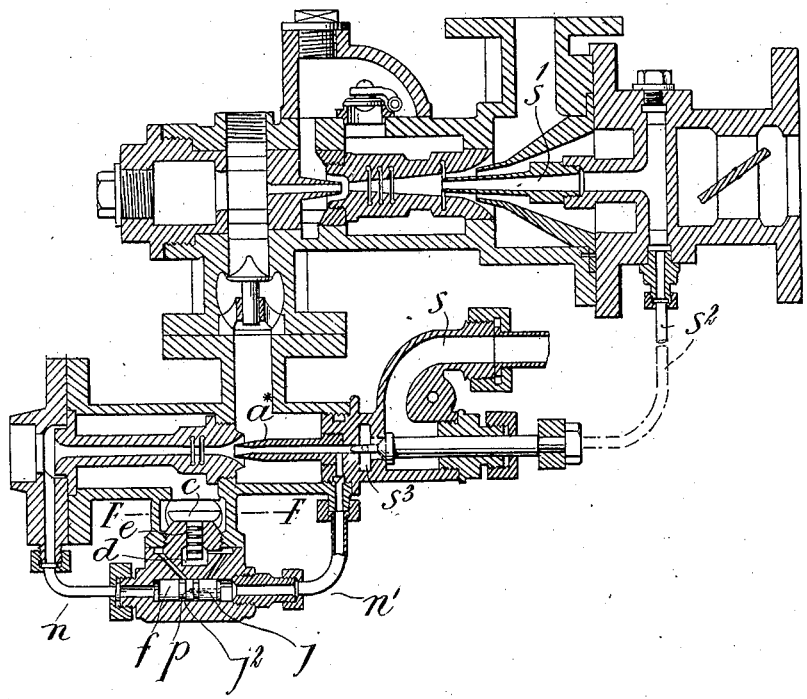
Figure 12:
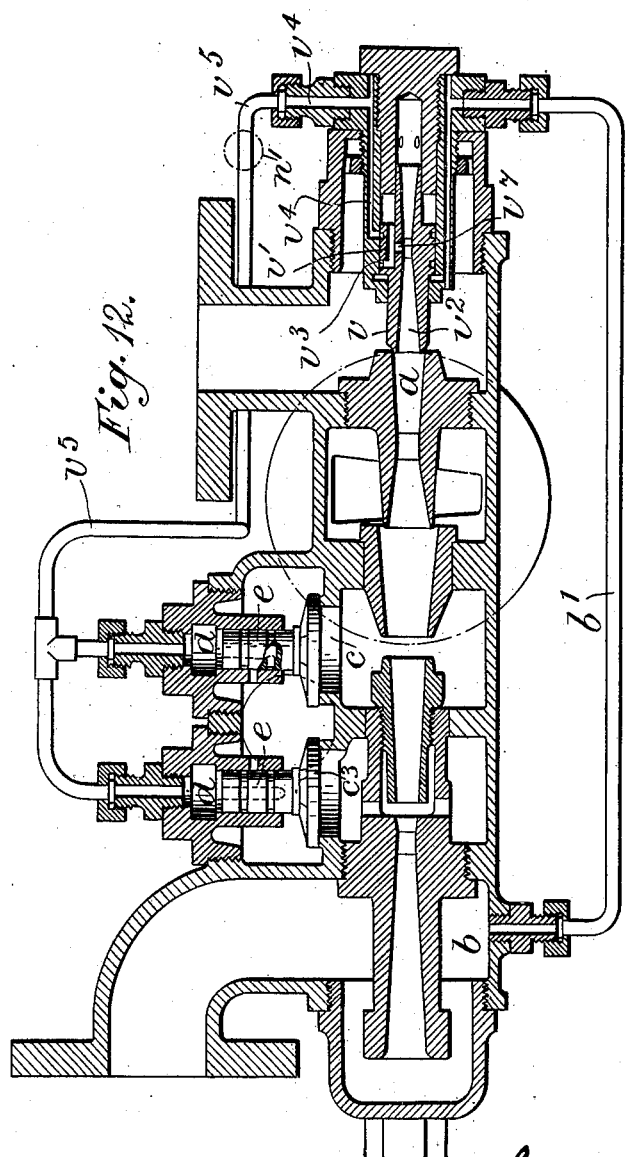
Figure 13:
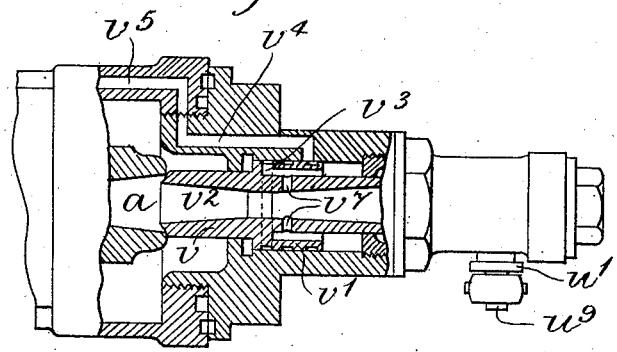
Figure 14:
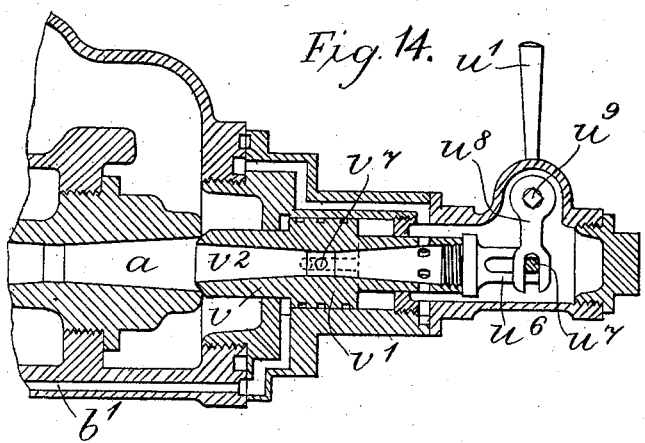

In the accompanying illustrative drawings Figure 1 shows in central longitudinal section on the line A A of Fig. 2, the parts of one constructional form of injector essential to an understanding of the invention, Fig. 2 being a plan thereof partly in horizontal section on the line B B of Fig. 4. Figs. 3 and 4 are end elevations with parts in section corresponding respectively to the lines C C and D D of Fig. 2. Figs. 5 and 6 are fragmentary and more or less diagrammatic views of two modifications. Figs. 7, 8 and 9 are respectively a longitudinal section plan and cross section of an injector having two overflow valves, Fig. 7 being a section on the line E E of Fig. 8. Fig. 10 is a side elevation, partly in section on the line F F of Fig. 11, and Fig. 11 is a section on the line G G of Fig. 10 of an exhaust and supplementary injector embodying the invention. Fig. 12 is a sectional elevation of a self re-starting injector embodying the invention. Figs. 13 and 14 are sectional views of a modification of Fig. 12.

In all these figures where the same or equivalent parts are found, $a$ represents the steam nozzle, $b$ the delivery chamber, $c$ the overflow valve, $d$ the pressure chamber and $e$ the piston connected to the overflow valve.

According to the example shown in Figs. 1 to 4, a piston or valve $f$ may be employed arranged to slide in a cylinder or casing $g$ between two seats $h$, $h^1$ against one of which it is forced by the steam of reduced pressure acting on one end, and against the other of which it is forced by the delivery pressure acting on the opposite end, the one pressure overcoming the other alternatively and so deciding the position of the piston or valve $f$, according to circumstances. For instance, the piston or valve $f$ (sometimes hereinafter referred to as the shuttle valve) is arranged so that at starting the steam pressure on the end $f^1$ thereof overcomes the pressure from the delivery chamber $b$ acting on the other end $f^2$ and the shuttle valve $f$ is in consequence forced by the excess pressure at the steam end $f^1$ onto the seat $h$ at the delivery end. When the injector is at work the conditions are reversed and the pressure at the delivery end $f^2$ forces the piston onto the seat $h^1$ at the steam end. The motion of the valve $f$ thus produced may be utilized to control the admission of steam to the pressure chamber $d$ pertaining to the overflow valve $c$ in any convenient way, such as by providing the shuttle valve $f$ with a central or other longitudinal port or passage $i$ communicating with a lateral port or annular groove or through lateral ports $j$ with an annular groove $j^1$, which, when the valve engages the seat $h^1$ at the steam end of its cylinder or casing $g$ registers with a port or passage or a number of passages $k$ leading to the pressure chamber $d$ but at other times closes it or them. The position of the valve casing $g$ can be varied but it may conveniently be disposed as shown in the present example, longitudinally of the body of the injector, tubes, or suitable passages in the body, serving to effect the required connections. For convenience the casing $g$ may be removably mounted in the casting or casing of the injector, means being provided for establishing the required steam and fluid passages and cocks provided to enable the injector to be used without the overflow valve control described, when the casing $g$ is removed.

In the said Figs. 1 to 4, the following arrangement has been chosen as embraced by the foregoing description. The casing $g$, circumferentially grooved on the exterior, is formed with a screw threaded portion $g^1$ engaging a correspondingly screw threaded portion in the body of the injector to facilitate its insertion and removal. The passages $k$ in the casing $g$ open into an annular space $m$ which communicates by passages $m^1$ and $m^2$, annular space $m^3$ and passages $m^4$ (Fig. 3) with the pressure chamber $d$. The fluid from the delivery chamber $b$ is conducted by passages $b^1$ to the space $b^2$ into which open radial passages $g^2$ in the casing $g$. Steam of reduced pressure is conducted from the throat of the nozzle $a$ by radial passages $a^1$, an annular space $a^2$ and a space $a^3$ in the injector body to the space $a^4$ into which the inner end of the casing $g$ opens. $n$, $n^1$ are the cut off cocks controlling respectively the passages $b^1$, $a^3$. Should the delivery pressure not appreciably exceed the steam pressure acting on the opposite end of the valve $f$, the areas of the two ends that are exposed to pressure may be made differential. As will be obvious a shuttle valve $f$ might be arranged to directly cover and uncover a port or passage in the wall of the casing $g$ leading to the pressure chamber $d$, and that by a simple reversal of either of these arrangements, or their equivalent, fluid under pressure from the delivery chamber $b$ could be admitted to the pressure chamber $d$ in lieu of steam.

Figs. 5 and 6 illustrate modifications according to the last two paragraphs hereof. Thus, Fig. 5 shows the shuttle valve $f$ as having two diameters, the end $f^2$ being, as before, subject to the pressure of fluid in the delivery chamber of the injector and the end $f^1$ to the reduced steam pressure. $k$ represents the passage leading to the pressure chamber $d$ (Fig. 1) and $k^1$ a relief passage branching from the passage $k$. An annular groove $j^1$, as before, coöperates with the passage $k$, and another annular groove $j^2$ coöperates with the relief passage $k^1$. The arrangement is such that when steam is turned on to start the injector, the valve $f$ will be moved from the position shown to cause the end $f^2$ to engage the seat $h$, at which time the relief passage $k^1$ is opened through the groove $j^2$. The parts may be so proportioned that the passage $k$ is then also closed to steam, the relief passage $k^1$ insuring that the overflow valve shall be free to open. As soon, however, as the pressure in the delivery chamber $b$ is sufficient to move the shuttle valve $f$ back to the position shown, the passage $k$ is opened and the relief passage $k^1$ closed to permit steam to accumulate in the pressure chamber and close the overflow valve if not already closed or if closed to hold it closed. Similarly, in Fig. 6, where the shuttle valve $f$ is shown as of uniform diameter, fluid from the delivery chamber of the injector may flow through the passage $f^3$ in the valve $f$ and passage $k$ and accumulate in the pressure chamber when the parts are in the position illustrated, whereas when, at starting, the said valve is reversed in position, the relief passage $k^1$ will be opened through the annular passage $j^2$ and the overflow valve permitted to open.

In Figs. 7, 8 and 9 the shuttle valve $f$ and casing $g$ are disposed transversely of the injector and the steam admitted to the pressure chamber $d$ is permitted to pass through a passage $e^2$ in the plunger $e$ into a cavity $d^1$ in the valve $c$, acting as a pressure chamber for the extension $e^3$ of a lower overflow valve $c^1$, thereby supplementing the pressure exerted upon the valve $c^1$ by the fluid in the overflow chamber $p^3$.

In Fig. 1 relief holes $e^1$ are shown near the top of the overflow valve piston $e$ for relieving pressure in the chamber $d$, as described in the specification of my application for Letters Patent Serial No. 556122 filed April 18th 1910, but the said chamber $d$ may be placed in direct communication with the atmosphere by means of the shuttle valve $f$ itself when it is in the position in which the injector is not working. As shown in Figs. 8 and 9, the shuttle valve $f$ is in position for conducting steam to the pressure chamber $d$, at which time a port $p$ leading to the overflow outlet $p^1$ is covered by the valve. When however the injector stops or throws off, the valve $f$ is forced to the other extreme position and communication is established between the port $p$ and a passage $p^2$ leading from the pressure chamber $d$ through an annular groove $j^2$ in the shuttle valve.

In the combined exhaust and supplementary injector shown in Figs. 10 and 11, live steam is supplied to the supplementary injector by way of the inlet $s$ under hand control and passes to the exhaust injector live steam nozzle $s^1$ by the pipe connection $s^2$ from chamber $s^3$. The shuttle valve $f$ which is substantially the same as that described with reference to Figs. 8 and 9, is shown as deriving steam of reduced pressure from the nozzle $a^x$ and in position placing the pressure chamber $d$ of the supplementary injector in communication with the atmosphere, $p$ being the outlet passage leading from the groove $j^2$.

While in the forms already described a special piston or valve and connections have been contemplated for admitting steam or delivery fluid to the pressure chamber, it is to be understood that such steam or fluid might equally be admitted to the pressure chamber by movement of a piston, spindle or the like employed for another purpose. Thus, where the starting or restarting of the injector is, as shown in Fig. 12, automatically effected by a spindle $v$ adapted to restrict the area of the steam nozzle $a$, such as is described in the specifications of my applications for Letters Patent Serial Nos. 556122 and 556123, filed 18th April 1910, the said spindle on being retracted may place a space containing steam of reduced pressure, or the delivery chamber, in communication with the pressure chamber, the arrangement illustrated being one in which the piston $v^1$ upon the spindle $v$ having a Venturi-like passage $v^2$ is acted upon at one side by steam derived from such passage $v^2$ through the port $v^*$ and at the opposite side by fluid under pressure from the delivery chamber $b$ through the pipe $b^1$, a passage $v^3$ formed in such piston $v^1$ permitting steam from the passage $v^2$ to pass by way of a passage $v^4$ and pipe $v^5$ to the pressure chambers $d$ of two overflow valves $c$, $c^3$. Or either of the said overflow valves alone may be closed in the manner referred to.

In some cases it may be desired to provide an automatic starting arrangement such as referred to and also means for positively operating the said arrangement should the automatic action fail. To effect this, the starting spindle $v$ may, as shown in Figs. 13 and 14, be provided with a slotted extremity $u^6$ or crosshead, adapted to receive a cam, or a pin $u^7$ working between the bifurcated ends of a lever $u^8$, which is angularly displaced by means of a spindle $u^9$ passing from the exterior to the interior of the casting or casing of the injector in such a manner that the starting spindle $v$ can be positively retracted from the steam nozzle, if required, but so that when not so withdrawn the automatic retracting of such spindle is not interfered with. The rotation or rocking of the operating spindle $u^9$ can be effected by means of a hand lever $u^1$, wheel or the like.

Since the control of the overflow valve in the several arrangements hereinbefore described is more especially required when working with hot feed water, and particularly with steam of high pressure, one or more cocks or valves may be employed, in cases where so desired, to cut off, either from the steam of reduced pressure or delivery fluid, or from both, communication with the pressure chamber when not working with hot water, the steam cock where shown in the examples described being lettered $n^1$ and the delivery cock $n$.

What I claim is:—

1. In an injector, the combination with an overflow valve, of a fluid pressure chamber, a movable device in communication with the said chamber and adapted to impart movement to the overflow valve, a tube in which steam during its passage through the injector experiences an increase in velocity and reduction in pressure, a passage extending between the pressure chamber and a fluid pressure space in the interior of the injector, and a valve device subject to the opposing pressures of fluid in the delivery of the injector and steam from the tube aforesaid and adapted to be moved by the steam pressure and complete the communication between the pressure chamber and the fluid pressure space aforesaid when the injector is working.

2. In an injector, the combination with an overflow valve, of a fluid pressure chamber, a movable device in communication with the said chamber and adapted to impart movement to the overflow valve, a tube in which steam during its passage through the injector experiences an increase in velocity and a reduction in pressure, a system of passages adapted to place the interior of the tube in communication with the pressure chamber and a valve device subject to the opposing pressures of fluid in the delivery of the injector and steam from the tube aforesaid and adapted to be moved by the steam pressure and complete the communication between the tube and pressure chamber when the injector is working.

3. In an injector, the combination with an overflow valve, of a fluid pressure chamber, a movable device in communication with said chamber and adapted to impart movement to the overflow valve, a throated steam nozzle, a valve casing intermediate of the pressure chamber and nozzle, passages connecting opposite ends of the said valve casing to the delivery of the injector and the throat of the steam nozzle respectively, a port intermediate of the ends of the valve casing in communication with the pressure chamber and a hollow and ported shuttle valve arranged in the valve casing and adapted to be moved to one end thereof by the pressure of fluid from the delivery of the injector and cause the hollow part and ports of the shuttle valve to establish communication between the steam nozzle and pressure chamber and to be moved to the opposite end of the casing by steam pressure to interrupt such communication.

4. In an injector, the combination with an overflow valve, of a fluid pressure chamber, a movable device in communication with said chamber and adapted to impart movement to the overflow valve, a throated steam nozzle, a valve casing intermediate of the pressure chamber and nozzle, passages connecting opposite ends of the said valve casing to the delivery of the injector and the throat of the steam nozzle respectively, a port intermediate of the ends of the valve casing in communication with the pressure chamber, a hollow and ported shuttle valve arranged in the valve casing and adapted to be moved to one end thereof by the pressure of fluid from the delivery of the injector and cause the hollow part and ports of the shuttle valve to establish communication between the steam nozzle and pressure chamber and to be moved to the opposite end of the casing by steam pressure to interrupt such communication, and valves adapted to isolate the shuttle valve casing from the delivery of the injector and the steam nozzle.

5. In an injector, the combination with an overflow valve, a fluid pressure chamber and a movable device in communication with the said chamber and adapted to close the said valve, of a valve casing open at one end to steam pressure and at the other end to the delivery of the injector, a passage leading from a point intermediate of the length of the valve casing to the delivery chamber, a second passage leading from another point intermediate of the length of the valve casing to the pressure chamber, a companion passage to the said second passage leading to the atmosphere and a shuttle valve having firstly a hollow portion and ports adapted in one position of the valve to place one end of the valve casing in communication with the pressure chamber and secondly a passage adapted in another position of the valve to place the pressure chamber in communication with the atmosphere.

6. In an injector, the combination with a pressure chamber for closing an overflow valve, and a shuttle valve controlling the admission of fluid thereto, of a casing, inside which casing the shuttle valve is confined, and a cylindrical housing in the injector in which the valve casing is removably retained.

7. In an injector, the combination with a pressure chamber adapted to secure closure of an overflow valve, and a shuttle valve controlling the admission of fluid thereto, of a cylindrical housing in the injector, a fluid conducting passage leading from the delivery of the injector to one end of the housing, a fluid conducting passage leading from the steam nozzle to the opposite end of the housing, a third fluid conducting passage leading from the pressure chamber to a point intermediate of the length of the housing, a casing, in which the shuttle valve is confined, having a circumferentially grooved exterior surface and adapted to be removably fitted into the housing to isolate the several fluid conducting passages, and means adapted to close the passages leading to the delivery of the injector and steam nozzle when the valve casing is removed.

Signed at Manchester, England, this twenty-sixth day of October 1910.

ROBERT GRUNDY BROOKE.

Witnesses:
ERNALD SIMPSON MOSELEY,
MALCOLM SMETHURST.

---

Copies of this patent may be obtained for five cents each, by addressing the "Commissioner of Patents, Washington, D. C."